Figure 1:
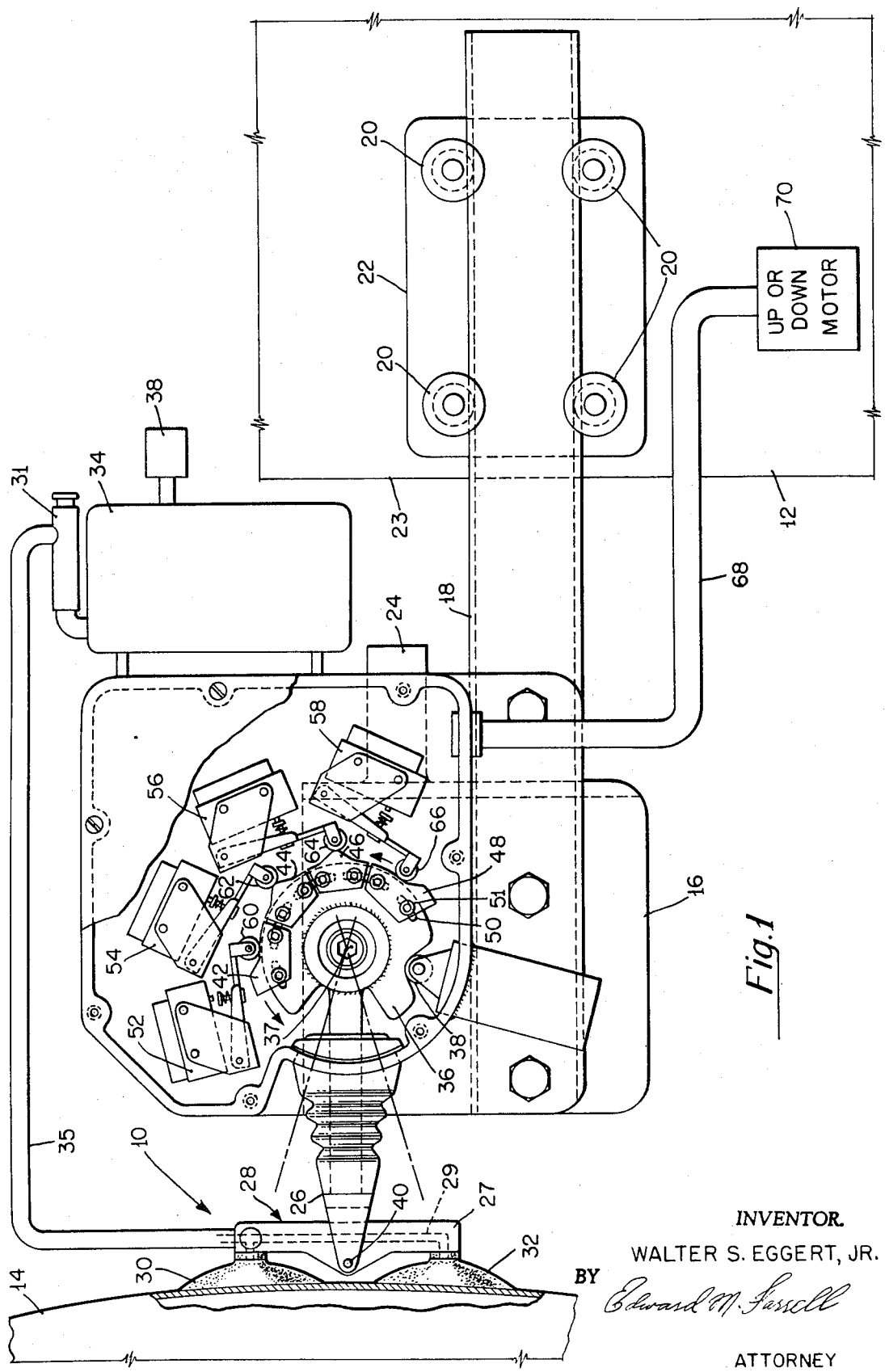

United States Patent
Eggert, Jr.

[15] 3,689,822
[45] Sept. 5, 1972

[54] MOTOR CONTROLLED AUTOMATIC LEVELLER CIRCUIT

[72] Inventor: Walter S. Eggert, Jr., Huntingdon Valley, Pa.

[73] Assignee: Boothe Airside Services, Inc.

[22] Filed: Jan. 28, 1971

[21] Appl. No.: 110,432

Related U.S. Application Data

[63] Continuation-in-part of Ser. Nos. 15,537, March 2, 1970, Pat. No. 3,628,117, and Ser. No. 76,346, Sept. 29, 1970.

[52] U.S. Cl..................................318/648, 318/675
[51] Int. Cl..............................................B64c 17/02
[58] Field of Search..........................318/648, 675

[56] References Cited

UNITED STATES PATENTS 3,271,650  9/1966  Riddle......................318/648
1,996,055  4/1935  Boykow..................318/648 X Primary Examiner—T. E. Lynch
Attorney—Stowell & Stowell

[57] ABSTRACT

An electrical circuit provides automatic levelling to maintain two movable bodies in the same relative positions with respect to each other. When the position of one body changes in a given plane, mechanical means are moved to actuate switching circuitry to restore the bodies to their original relative positions.

7 Claims, 3 Drawing Figures

MOTOR CONTROLLED AUTOMATIC LEVELLER CIRCUIT

This application is a continuation-in-part of applications of W. S. Eggert entitled "Automatic Leveller Circuit," Ser. No. 15,537, now U.S. Pat No. 3,628,117, filed Mar. 2, 1970 and "Vertical Movement Sensor," Ser. No. 76,346, filed Sept. 29, 1970.

In many situations, it is necessary to line up the floors of two vehicles, for example, to permit transfer of material or passengers from one vehicle to the other. It is desirable in these cases to have the relative positions of the floor or platforms maintained in the same plane during the transfer operation. In many cases, the level of one of the floors may vary slightly during the transfer operation as a result of different load conditions.

One such example wherein it is desirable to maintain the relative positions of two bodies involves the use of a passenger transfer vehicle where passengers are transferred from the vehicle to an aircraft. One such type vehicle is described in a U.S. Pat. No. 3,537,745 entitled "Aircraft Transfer Vehicle." In a vehicle of this type, passengers are transferred from the vehicle onto an aircraft. During the loading and unloading operation the relative levels of the floors of the transfer vehicle and aircraft may vary because of the variations in load conditions during the transfer operation. These variations in floor levels, if not remedied, create hazardous conditions for passengers moving to or from the vehicle and aircraft.

It is desirable to automatically adjust the levels of the floors of the vehicle and/or aircraft to maintain them relatively constant during transfer operations.

It is an object of this invention to provide a novel electrical circuit and actuating means therefor for maintaining two movable bodies in relatively fixed relationship with respect to each other under varying load conditions.

It is a further object of this invention to provide a novel system for restoring to predetermined relative positions two main bodies when one of the bodies has moved beyond a predetermined distance with respect to the other.

It is still a further object of this invention to provide a novel system for restoring to predetermined relative positions two bodies when one of the bodies has moved beyond a predetermined distance with respect to the other wherein means are provided to vary said predetermined distance.

In accordance with the present invention, a system for maintaining the relative position of a first body with respect to a second body includes cam means movable in accordance with the relative movement between the first and second bodies to control the operation of switches. Motor means are connected to the switches to move and maintain the first body in a fixed relative position with respect to the second body after the bodies have moved beyond a predetermined distance with respect to each other.

Figure 2:
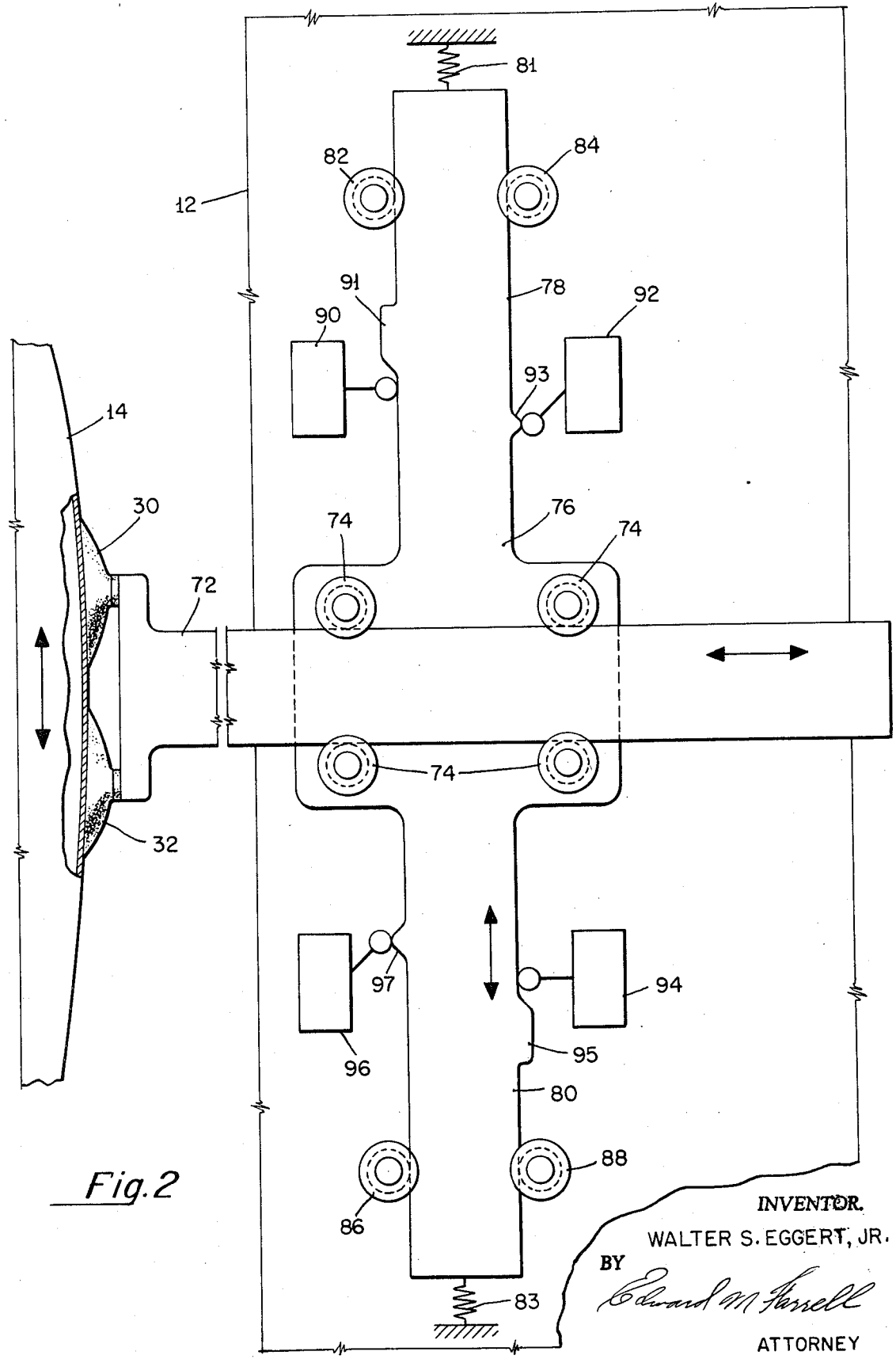
Figure 3:
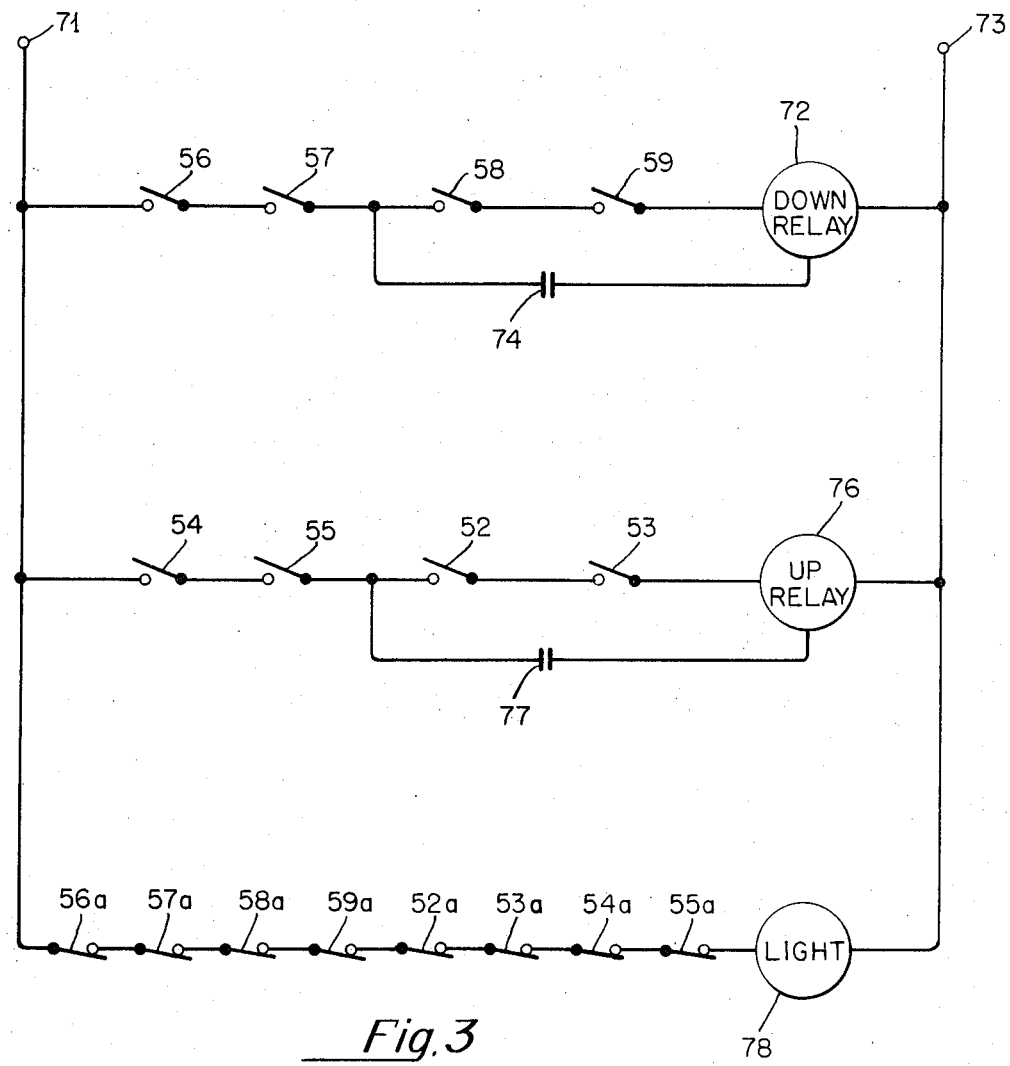

Other objects and advantages of the present invention will be apparent and suggest themselves to those skilled in the art, from a reading of the following specification and claims, in conjunction with the accompanying drawing, in which:

FIGS. 1 and 2 represent side views, partly broken away and in cross section, of two embodiments of mechanical sensing arrangements which may be used to actuate the circuit of FIG. 3, in accordance with the present invention, and FIG. 3 is a schematic circuit diagram of a switching arrangement which may be used with the devices illustrated in FIGS. 1 and 2.

Referring to FIG. 1, an automatic levelling system includes the sensing means 10 movably mounted to a vehicle 12. The vehicle 12 may be of the type for transporting passengers between an airport terminal and an aircraft 14, such as described in the aforementioned U.S. Pat. No. 3,537,745.

In a typical situation, a driver of the vehicle 12 brings it relatively close to the aircraft 14 and then adjusts the ramp or platform of the vehicle to a level corresponding to the level of the floor of the aircraft 14. As passengers pass from one vehicle to the other, the floor level of the vehicle 12 with respect to the floor level of the aircraft 14 may move either up or down. The variations in floor levels may result from the transfer of passengers, variations in loads between the aircraft and the vehicle, or for other reasons.

The assembly 16 including the sensing device 10 mounted thereon is mounted to a rail 18 by any suitable means. The rail 18 is adapted to move in and out on a plurality of rollers 20. The rollers 20 are secured to a mounting plate 22 which in turn is secured to the side wall 23 of the vehicle 12. The entire assembly 16 including the sensing device 10, while illustrated in an extended operative condition, is normally held retracted by a latch 24 when the vehicle 12 is moving free of the aircraft 14. Such latches are well known and the details thereof are not illustrated.

After the vehicle 12 is moved within some predetermined distance of the aircraft and the initial floor levelling between the two crafts is attained, an operator releases the latch 24 making it possible for the operator to manually move the rail 18 over the rollers 20. The operator may then move the entire assembly outwardly so that an extendible member 26 is extended towards the aircraft 14. The extendible member 26 includes an attachment assembly 28 for attachment to the surface of the aircraft 14.

The attachment assembly 28, which forms part of the sensing means 10, includes a coupling member 27 having a fluid passageway 29 therein. A pair of suction cups 30 and 32 is mounted to the coupling member 27 so that the interiors of the suction cups are fluid coupled to the passageway 29. The interior of the suction cups are both therefore connected through the coupling member 27. A flexible hose 35 is connected to the coupling member 27 to connect the passageway 29 to a compressor 34. The compressor 34 may be actuated by a switch 38. When the compressor is operative, exhaust pressure is created to evacuate the air within the suction cups 30 and 32 which is evaluated through the hose 35. Air from the hose is passed into the atmosphere through the evacuator 31. The vacuum created with the suction cups 30 and 32 cause them to be firmly attached to the surfaces of the aircraft 14.

The extendible element 26 is pivotally mounted to a housing or frame 16 at pivot point 37. Thus the extendible element 26 is free to move up and down about the pivot point 38. The attachment assembly 28 is pivotally mounted to the end of the extendible element about the pivot point 40.

Changes in the relative positions between the aircraft 14 and the vehicle 12 cause the extendible element 26 to move up or down about the pivot point 37 depending upon the direction of relative movement between the two bodies. However, despite changes in the relative positions between the two bodies, the attachment assembly 28 carrying the suction cups 30 and 32 are maintained in a fixed relationship with respect to the plane 14. The assembly attachment 28 on the aircraft 14 may be considered the equivalent of a permanent mechanical mounting on the aircraft with means to permit the extendible element 26 to be pivotally attached thereto.

The use of two suction cups instead of one provides advantages. For example, if a single suction cup were used on the end of the extendible member 26 and the two attached bodies were moved relative to each other, the single suction cup would be stressed with one portion of the cup tending to expand while another portion would tend to be compressed. The result would be a slight error in the sensing system. With a double suction cup arrangement, such as that illustrated, relative movement between the two bodies will not cause any flexing of the suction cups thereby making possible a more accurate sensing system responsive solely to the relative movement of the bodies.

Cam means include a plurality of cam elements 42, 44, 46 and 48 mounted to the member 36 by means of screws or other suitable means. The member 36 is maintained in a neutral position by a spring loaded roller 38 disposed within a groove in the member 36. The member 36 may include slightly elongated holes 50 to permit the cam members 42, 44, 46 and 48 to be mounted in slightly different positions with respect to each other. After the cam members are mounted in the position desired, the screws 51 associated therewith are tightened. Such adjustment screws are well known to those skilled in the art and therefore not shown or described in great detail. However, the means for adjusting the positions of the cam elements slightly with respect to each other provide a feature of the present invention, as will be described in connection with FIG. 3.

When the floor or ramp level of the vehicle 12 varies with respect to the aircraft 14, the pivotable member 26 moves about its axis to actuate a plurality of switches which controls a motor to restore the original relative positions of the levels of the floors in the vehicle and aircraft.

The various cam elements 42, 44, 46 and 48 are adapted to actuate a plurality of switches 52, 54, 56 and 58, respectively. The switches include a plurality of rollers 60, 62, 64 and 66, which are disposed to be actuated by the various cam elements to open or close selected switches dependent upon the position of the pivotable element 26. The switches 52, 54, 56 and 58 may be paired with other switches to provide a redundancy factor in the system. Also, the switches may be associated with additional contacts to provide a warning light to indicate faulty operation, as will be described. These additional switches and contacts, while not illustrated in FIG. 1 are shown in the schematic diagram of FIG. 3, to be described.

The switches 52, 54, 56 and 58 are connected to a cable 68 to control various motor means 70 which may include up and down motors to control the up and down motion of the vehicle 12, as well as appropriate relays. Dependent upon the operating states of the various switches, the motor means 70 will remain in a neutral position or move the vehicle 12 up and down. When the floor level of the vehicle 12 changes with respect to the floor level of the aircraft 14, the motor means 70 will become operative as a result of the actuation of selected switches to return the floor level of the vehicle 12 to its original position with respect to the floor level of the aircraft 14.

In practicing the subject invention it is realized that certain tolerances must be set. For example, if the degree of movement of the floor of the vehicle and aircraft is very slight or insignificant, the motor means 70 will not be operated. However, if the degree of movement is relatively great or beyond a predetermined limit, the motor means 70 will become operative. This arrangement prevents jitter or over-sensitivity in the system which would tend to create a vibrating movement of the floor of the vehicle. The spacing of the cam elements which control the operation of the switches determines the distance at which the restoring motor means 70 becomes operative.

Referring particularly to FIG. 2, a somewhat different arrangement for attaching the suction cups to the surface of an airplane 14 as illustrated. In this case, however, the extendible means 72 is not pivotable about a point on the vehicle 12. For purposes of clarity the compressor and various elements for producing vacuum in the suction cups 30 and 32 are not illustrated, it being understood that the same arrangement illustrated and described in connection with FIG. 1 may also be used with the arrangement of FIG. 2.

The suctions cups 30 and 32 are fixedly mounted to the end of the extendible element 72. An operator may manually extend the extendible element 72 through a plurality of rollers 74 until the suction cups 30 and 32 are attached to the surface of the aircraft.

The rollers 74 are mounted to a plate 76. The plate 76 includes a pair of extending portions 78 and 80. The plate 76 and all parts associated therewith is adapted to be moved up and down and may be held normally centered by biasing springs 81 and 83 fixedly mounted to the aircraft 12.

The extending portion 78 is adapted to ride vertically up and down along rollers 82 and 84. The extending portion 80 is adapted to ride vertically up and down along rollers 86 and 88. The entire plate member 76 is adapted to be moved up and down in accordance with the movement of the extendible portion 72.

When the extendible element 72 extends upwardly or downwardly, various selected ones of the switches 90, 92, 94 and 96, associated with various roller, are actuated by cam elements 91, 93, 95 and 97. The electrical circuitry actuated by the arrangements of FIG. 1 and 2 is illustrated in FIG. 3.

Referring particularly to FIG. 3, the circuitry illustrated will be related to the operation of the embodiment illustrated in FIG. 1, it being understood that it could also be related to the embodiment of FIG. 2. First assume that the vehicle 12 is moved upwardly. In this case, the pivotable element 26 will be pivoted about the point 37 with the vacuum cups 30 and 32 maintain contact with the surface of the aircraft 14.

When the element 26 is pivoted in a counter-clockwise direction, the member 36 is also turned to rotate the cam elements 42, 44, 46 and 48. Rotation of the cam member 46 causes normally open switches 56 and 57 to close. The double switch arrangement provides a redundnacy feature. As mentioned, the switch 57 is not illustrated in FIG. 1. The closing of the switches 56 and 57 result from the roller 64 moving downwardly from its peak position on the cam element 46. However, no activation of any restoring force takes place until the member 36 moves a predetermined distance at which point the roller 66 rides up and contacts the top portion of the cam element 48. At this point, normally open switches 58 and 59 are closed. Power is then applied from the terminals 71 and 73 through the switches 56, 57, 58 and 59 to the relay 72. The relay 72 closes a pair of holding contacts 74. These contacts permit current to flow through the down relay 72 after the switches 58 and 59 are subsequently opened.

The operation of the down relay 72 causes the motor means 70 to become operative to cause the vehicle 12 to be moved downwardly. The downward movement of the vehicle 12 causes the pivotable element 26 to be rotated in a clockwise direction starting it back to its original position. When this happens, the roller 66 moves downwardly from the upper portion of the cam element 48 to cause the switches 58 and 59 to open. However, since the roller 64 has not yet reached its peak position on the cam element 46, the switches 56 and 57 will remain closed to keep the relay 72 operative.

As the pivotable element 26 continues its clockwise rotation, the roller 64 eventually reaches the peak of the cam element 46 causing the switches 56 and 57 to open. At this point, the relay 72 becomes inoperative. The motor means 70 will also become inoperative and the system will be at its original or neutral position. It is noted that while the switch 54 closes during the operation described, the switch 52 remains open preventing the up relay 76 from operating.

Consider now a situation in which the vehicle 12 is moved downwardly. When this happens the pivotable element 26 is pivoted clockwise about the pivot point 32. When the pivotable element 26 is moved in a clockwise direction, the roller 62 will move down from its peak position on the cam element 44 to close the switches 54 and 55. Again, switch 55 is not illustrated in FIG. 1, it being understood that the switch is in series with the switch 54. The closing of the switches 54 and 55 does not affect the operation of the motor means 70 until the member 36 has moved beyond a predetermined distance. At this point, the roller 60 rides up the cam element 42 to eventually close the normally open switches 52 and 53. With all the switches 54, 55, 52 and 53 closed, an up relay 76 becomes operative to close a pair of holding contacts 77.

Operation of the relay 76 causes the motor means 70 to become operative to move the vehicle 12 upwardly. This upward movement continues until the roller 60 rolls off the cam 42 to open the switches 52 and 53. At this point, the relay 76 continues to operate because the switches 54 and 55 are still closed. After the movement has proceeded beyond a predetermined distance the roller 62 moves to the high portion of the cam element 44 to open the switches 54 and 55 thereby making the relay 77 inoperative. At this point, the motor means 70 becomes inoperative and the system is restored to its original or equilibrium position. During the up operation, the down relay 72 will not be affected because the switches 58 and 59 will remain open since the roller 66 never rides up the cam 48.

The various switches illustrated may include multiple contacts. Sets of contacts are provided in the switches which are normally closed and adapted to be opened when their counterparts are closed. For example, a light 78 may be operative in a vehicle when all the switches 52a to 59a are closed. This will indicate that the switches are operating normally prior to any operation of the vehicle 12. When any one of the switches are defective or open, the light 78 will be out indicating some trouble in the switching arrangement.

It is noted that the various cam elements 42, 44, 46 and 48 may be adjusted slightly to vary the distance necessary to operate the motor means 70. This arrangement makes it possible to adjust the system so that no operation will take place unless the positions of the floor of the vehicles have moved beyond a predetermined distance, for example, one inch.

The switching means may be considered as two sets of switches disposed to be sequentially operated. The first set becomes operative when the floor of the vehicle moves from its neutral position with the second set becoming operative at a limit point at which a restoring motor is to be made operative. The restoring operation continues until the first set of switches is made inoperative.

While the circuitry of the subject invention has been described in connection with a passenger transfer vehicle and an aircraft, it is apparent that its application may relate to any two bodies wherein it is desired to restore their relative positions while various operations, such as varying loads, take place. Conceivably some elevator systems could use the present invention.

Also, while the circuit has been described in connection with two bodies which are movable in a vertical plane, some situations may arise where corrections must be made when the bodies are movable in a horizontal or angular plane.

What is claimed is:

1. An electro-mechanical control assembly for maintaining the level of a first body at a predetermined position relative to a movable second body of the type having a sensor and levelling controls mounted on the first body, characterized by:

an elongated extendible sensing member mounted on said first body and having a coupling member connected to the extended end of the sensing member, said coupling member being adapted to be connected to the movable second body, an operating member connected to the other end of said sensing member, control means cooperating with said operating member, comprising a pair of up-switches and a pair of down-switches for sensing the movement of the second body, each said pair of switches being connected in series and sequentially operable to start a levelling motor, and a hold circuit bypassing one of said switches in each said pair of switches whereby the other of said switches is solely operable to stop said levelling motor when said first body has been restored to said predetermined position relative to said second body.

2. An electro-mechanical control assembly as set forth in claim 1, wherein said control means comprises a plurality of spaced-apart cams set to sequentially operate said switches when said operating member is moved by said sensing member.

3. An electro-mechanical control assembly as set forth in claim 1, wherein said cams are adjustably mounted on said operating member for adjustably setting the sequence of operation of said switches.

4. An electro-mechanical control assembly as set forth in claim 3, wherein said pair of up-switches and down-switches each include a double pair of switch contacts, connected in series.

5. An electro-mechanical control assembly as set forth in claim 1, wherein said pair of up-switches and down-switches are each connected in series with a relay which is operable to close their respective switch contacts to operate the levelling motor.

6. An electro-mechanical control assembly as set forth in claim 5, wherein said hold circuit includes a pair of switch contacts operated by relays.

7. An electro-mechanical control assembly as set forth in claim 6 wherein said up-switches are connected in series with relay between a power source whereby said first switch is closed first, followed by the closing of said second switch to energize said relay and start said levelling motor which operation then first opens said second switch followed by said first switch, to de-energize said relay and stop said levelling motor.

* * * * *